G. H. NUSS AND C. F. HECKEL.
I. R. NUSS, EXECUTRIX OF G. H. NUSS, DEC'D.
STARCH BUCK.
APPLICATION FILED FEB. 24, 1920.
1,405,067.
Patented Jan. 31, 1922.
5 SHEETS—SHEET 1.
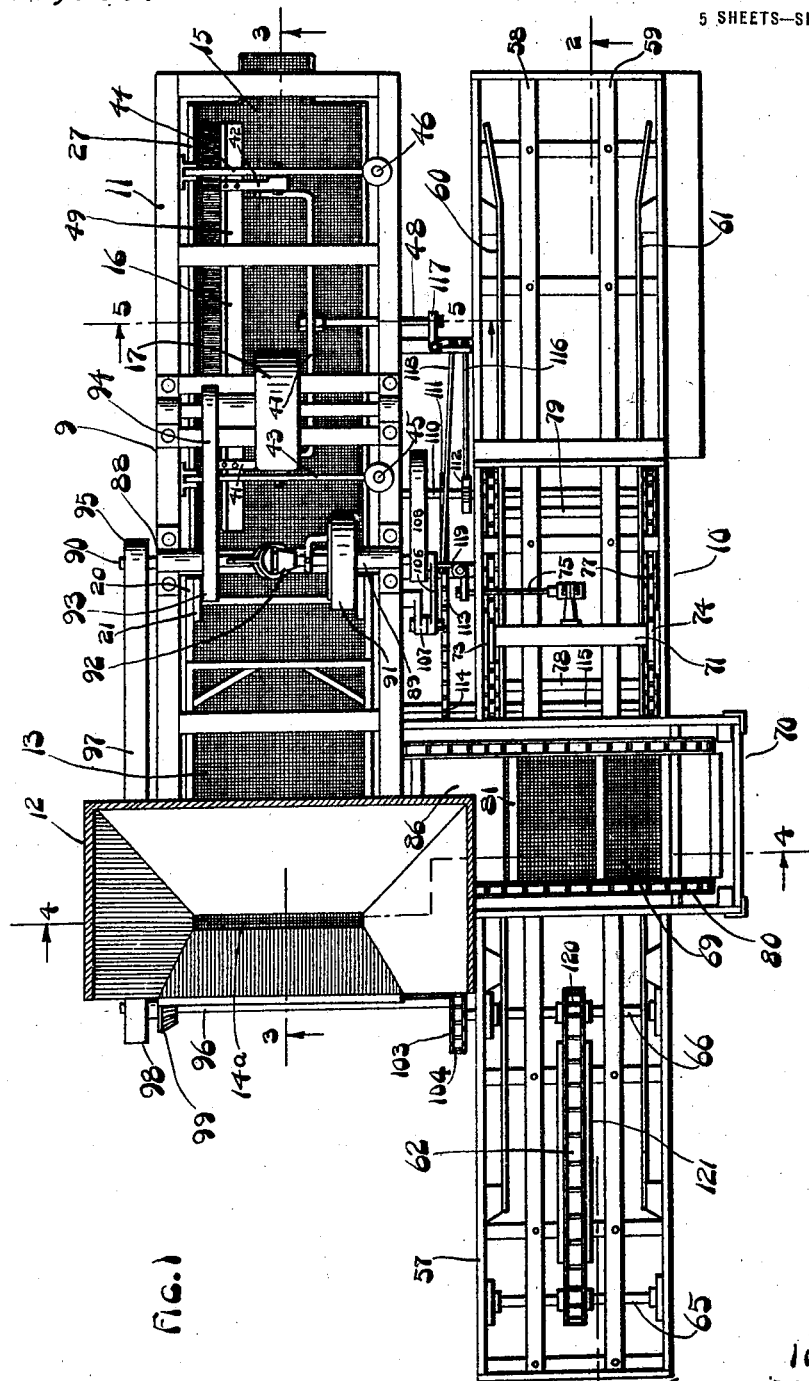

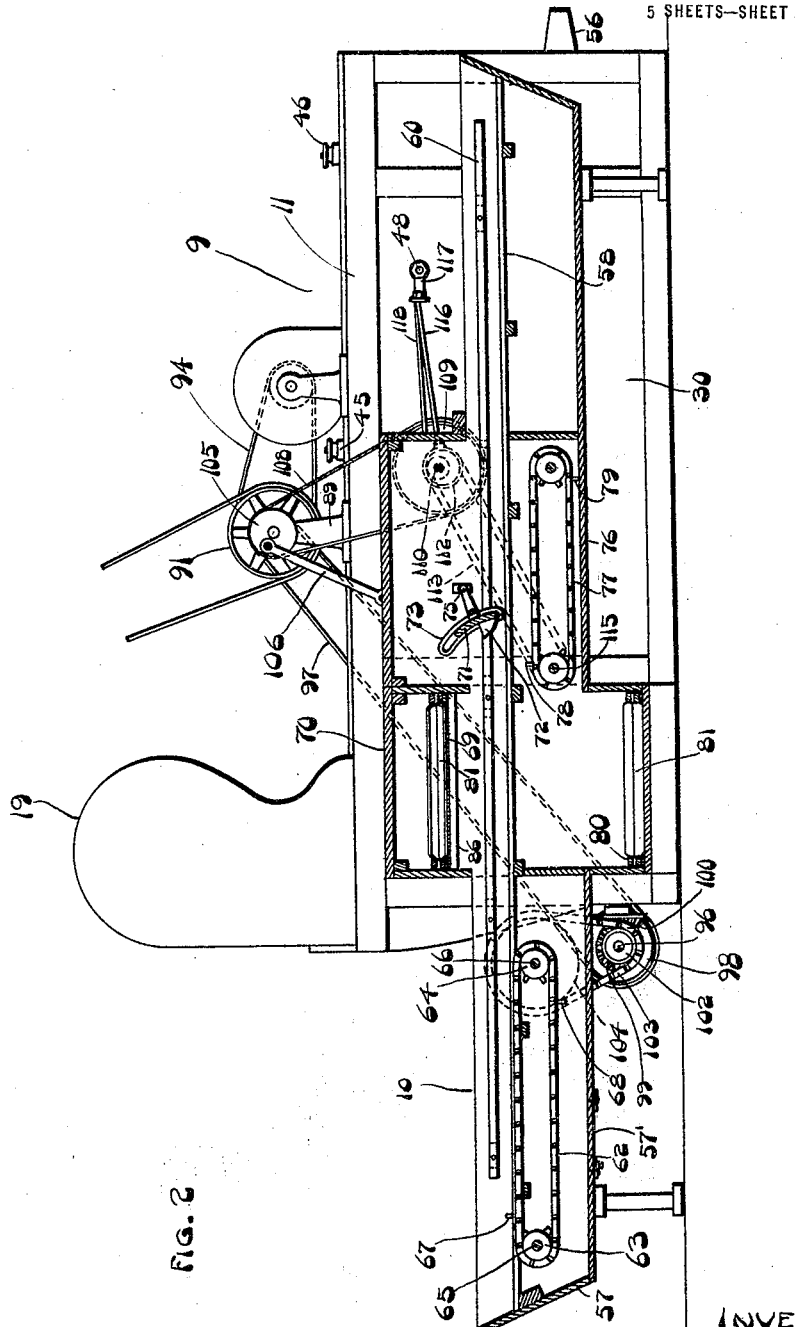

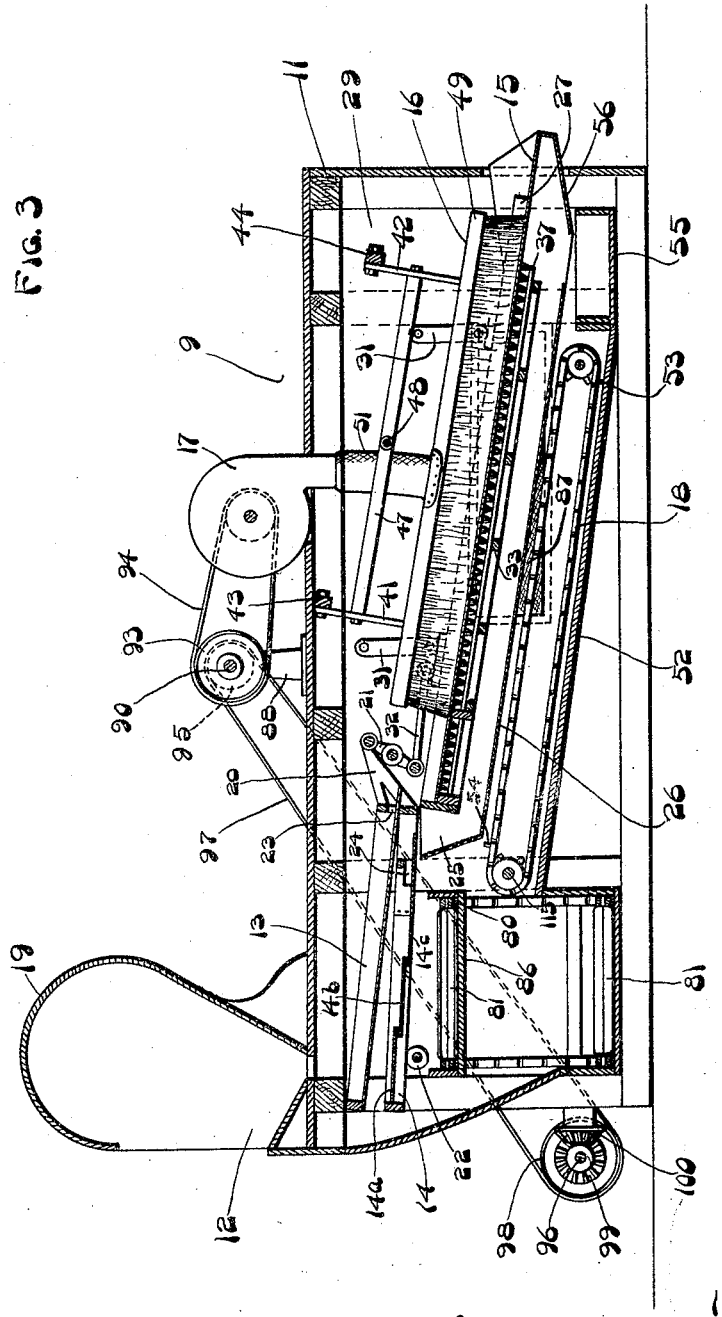

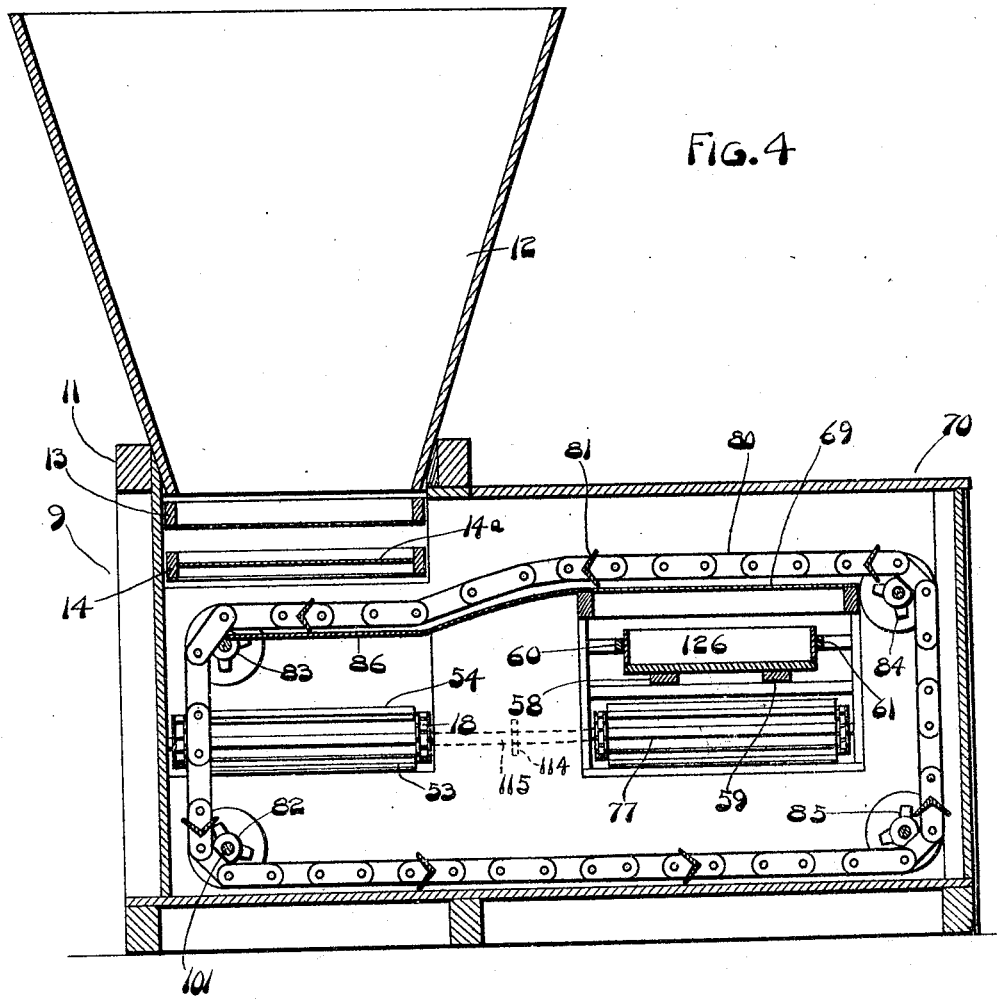

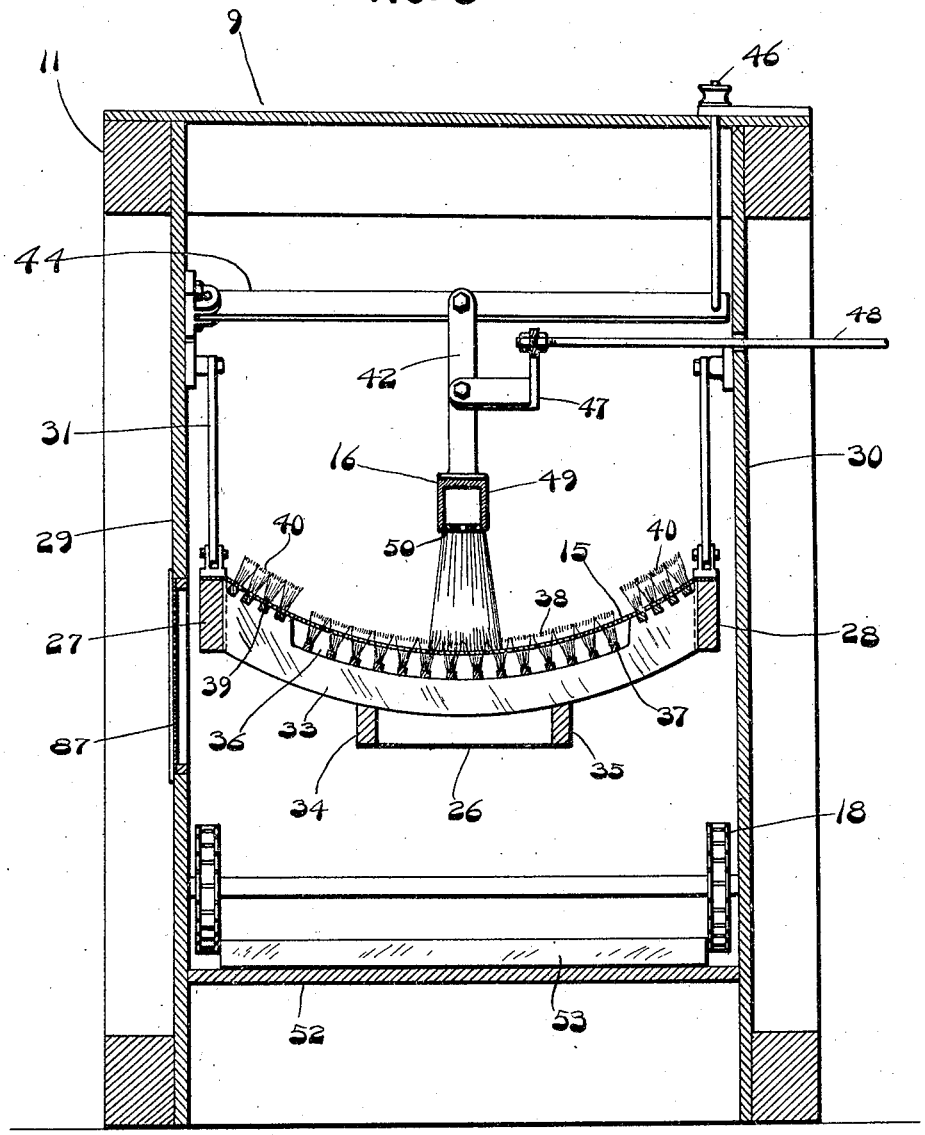

UNITED STATES PATENT OFFICE.

GEORGE H. NUSS, OF CINCINNATI, OHIO, AND CHARLES F. HECKEL, OF NEWPORT, KENTUCKY; ISABEL R. NUSS EXECUTRIX OF SAID GEORGE H. NUSS, DECEASED.

STARCH BUCK.

1,405,067.

Specification of Letters Patent.    Patented Jan. 31, 1922.

Application filed February 24, 1920. Serial No. 360,557.

*To all whom it may concern:*

Be it known that we, GEORGE H. NUSS and CHARLES F. HECKEL, citizens of the United States, and residents, respectively, of Cincinnati, in the county of Hamilton and State of Ohio, and of Newport, in the county of Campbell and State of Kentucky, have invented certain new and useful Improvements in Starch Bucks, of which the following is a specification.

Our invention relates to machines known to the trade as starch bucks, which are adapted to separate the starch from the candy; our invention also relates to the conveying and operating means of said machines.

Machines of the type herein described have been open to the objection that their operation has been attended with the dissemination of objectionable quantities of starch throughout the atmosphere of the room in which the machine is located, thus rendering such atmosphere dangerous from the standpoint of health and likelihood of explosion, as well as causing a waste of starch. Also machines of this type have resulted in either the destruction or damaging of starch trays being passed through the machine and in addition to these objectionable features the refilling of the starch trays has been accomplished in a very unsatisfactory manner, portions being left either unfilled and other portions being over-filled. Furthermore, the starch in being refilled into the trays has carried with it relatively large quantities of candy waste known as "tailings" thus rendering the operation of such a machine additionally expensive in that it necessitated either hand sifting of the starch or made it necessary to throw it away sooner or later along with the candy tailings it contained.

An object of our invention is, therefore, to produce a machine which will prevent the wasting of starch and candy tailings, and which will prevent contamination of the atmosphere of the room in which the machine is located, by preventing the passage of dust into the room.

These and other objects are attained in the starch buck described in the following specification and illustrated in the accompanying drawings in which:

Fig. 1 is a plan view of the starch buck embodying our invention;

Fig. 2 is a sectional elevation taken on the line 2—2 of Fig. 1;

Fig. 3 is a sectional elevation taken on the line 3—3 of Fig. 1;

Fig. 4 is a transverse sectional view, upon an enlarged scale, taken on the line 4—4 of Fig. 1;

Fig. 5 is a transverse sectional view, upon a greatly enlarged scale, taken on the line 5—5 of Fig. 1.

Our improved starch buck consists of two sections which we will designate candy-cleaning section 9 and the tray filling section 10 and in describing the machine, we will first describe section 9 and then section 10.

Section 9 consists of a frame 11 having a hopper 12 at one end with a series of vibrating screens 13, 14 and 15 located therein, screen 15 having a transversely swinging brush 16 cooperating therewith, a blower 17 being connected with the brush and a conveyor 18 being located beneath the screen 15. Hopper 12, into which the trays containing the moulded candies and starch are dumped, is provided with a hood 19 which is curved back toward the opening to the hopper for a purpose to be hereinafter described. The dumped starch and candy drops onto candy and starch separating screen 13, and the loose starch and tailings fall through this screen onto screen 14 located beneath screen 13, the two screens being mounted on a frame 20 which is supported on a rocker arm 21 at one end and a roller 22 at its opposite end. The candy on screen 13 passes through an opening 23 at one end thereof, thence dropping onto candy conveying screen 15 through hopper 25 at its upper end. The starch and tailings on screen 14 after dropping first upon a portion 14$^a$ of the screen, through which most of the starch falls, are caused to tumble onto a portion 14$^b$ of the screen, by reason of the vibration thereof, from which portion they are tumbled onto a lower portion 14$^c$ of the screen. In each tumble, a certain amount of starch is jarred through the screen 14, the tailings of candy passing through a converging opening 24 and then falling into a small hopper 25 which is at the rear of screen 15 and which leads to a tailings screen 26 beneath screen 15 but which is integral therewith as will now be described.

Screen 15 is interposed between the sides 27 and 28, see Fig. 5, of a frame which is swung from the sides 29 and 30 by links 31 so as to swing longitudinally of the section 9, a connecting rod 32 connecting the swinging frame with rocker arm 21. At intervals between sides 27 and 28 are cross braces 33 to the under sides of which longitudinally extending members 34 and 35 are attached for supporting screen 26. Extending longitudinally of the screen 15 and secured at spaced intervals in a depression 36 of each cross brace are a series of bristle carrying strips 37, the bristles 38 of which extend somewhat through screen 15. At each end of cross brace 33 a series of bristle carrying strips 39 are mounted, which extend longitudinally of the screen and the bristles 40 of which extend well beyond the upper surface of the screen and in excess of the bristles 38.

Above reciprocating screen 15 brush 16 is swung to move transversely of the screen by means of links 41 and 42 which are pivotally mounted centrally of a pair of transversely extending bars 43 and 44 which are hung pivotally to side 29 of the section 9 and which at their opposite ends are supported by adjustable links 45 and 46 for raising or lowering the position of the brush with relation to the screen 15. Links 41 and 42 of the brush are connected by member 47 centrally of which an operating rod 48 is attached and which extends through the side of the section 9 to the operating mechanism which will be hereinafter described. The bristles of brush 16 extend into brushing engagement with screen 15 between the bristles 38, thus coacting therewith in giving the candy falling upon screen 15 a very thorough brushing as it passes toward the exit of the screen. To assist in the thorough brushing given the candy by brush 16, the body 49 of the brush is hollow and is provided with a series of air passages 50, the interior of the brush being connected by a flexible air conduit 51 with fan 17. The air from fan 17 after passing through brush 16, screen 15, bristles 38 and 40 and screen 26, is discharged through cloth screen 87 in the side of section 9.

Beneath screen 26 we have provided an inclined platform 52 for receiving the starch, etc., sifted from the screen. Conveyor 18 carrying pusher bars 53 and 54 delivers starch from off platform 52 to the starch conveying section and keeps said platform cleaned of starch. At the lower end of platform 52 we have located a box 55 for receiving the tailings which fall through hopper 25 from the end of screen 26 as well as from the short sheet metal chute 56 at the end of screen 15.

Section 10 of our improved starch buck, through which the trays pass in the tray filling operation, consists of an elongated trough 57 throughout the length of which tracks 58 and 59 extend and upon which the trays to be filled are passed, guides 60 and 61 being provided for directing the movement of the trays through section 10. At the forward end of the section 10, we have provided a conveyor 62 which is passed over sprockets 63 and 64 mounted upon transversely extending shafts 65 and 66, the conveyor having pushers 67 and 68 which engage the trays as they are placed upon the tracks. These pushers operate to push successive trays beneath a sieve 69 in a starch conveying section 70, which will be described hereinafter. Here they are filled with starch and being pushed by the on-coming empty trays are brought into engagement with a leveler 71. This leveler has wings 72 which are curved on their under edges and when engaged by the forward edge of each tray, act to lift the leveler in its curved guide slots 73 and 74 so that it may rest upon the top edges of the trays. A connecting rod 75 is connected with leveler 71 and operates to reciprocate it transversely of trough 57 across the tops of the trays, mechanism which will be hereinafter described, being employed for this purpose. In its reciprocating action the wings 72 act to shift any excess starch sidewise of the trays and fill up unfilled corners, the body of the leveler scraping off all excess starch.

From this point the trays are pushed on to the end of the trough where they are removed in condition ready for the moulding operation. The starch which has been scraped from the trays by leveler 71, falls onto bottom 76 of the trough where a conveyor 77 by means of its pushers 78 and 79 operates to push the starch into starch conveying section 70 which will now be described.

Starch conveying section 70 is shown in its entirety in Fig. 4 and is provided with a conveyor 80 carrying a series of bucket-like pushers 81, the conveyors passing over sprockets 82, 83, 84 and 85. Bucket pushers 81 carry the surplus starch from the tray filling end of section 70, across the bottom thereof to the candy cleaning end and then lift it to a platform 86 located beneath tailings sieve 14 where the mass of the starch is deposited. From this platform the starch is carried to and pushed over screen 69 through which it is sifted into the empty trays passing beneath it.

The mechanism for operating the above described features of construction, will now be described. Located above section 9 in bearings 88 and 89 thereon, is the drive shaft 90 which is driven by a belt pulley 91 through a clutch 92. A pulley 93 on shaft 90 drives fan 17 by means of a belt 94. On one end of the shaft a pulley 95 is located for driving a shaft 96 at the bottom of the front of the machine by means of a belt 97 which passes over a pulley 98 on shaft 96. By means of bevel gears 99 and 100 on shaft 96 and on shaft 101 of the starch conveyor section, the starch conveyor 80 is operated. The opposite end of shaft 96 is provided with a sprocket 102 which, by means of a chain 103 passing over a sprocket 104 on shaft 66 of the tray pushing conveyor, drives the tray pushing conveyor.

At the opposite end of drive shaft 90 a crank pulley 105 is mounted for driving by means of a connecting rod 106 a crank 107 which reciprocates rocker arm 21. A belt 108 which passes over crank pulley 105 drives a pulley 109 which is mounted on a shaft 110 upon which a sprocket 111 and an eccentric 112 are mounted. A chain 113 passing over sprocket 111 drives conveyor 77 by means of a sprocket 114 located on shaft 115 thereof.

Eccentric 112 operates an eccentric rod 116, the opposite end of which is connected with one arm of a bell crank 117, the other arm of which being connected with rod 48 extending from member 47 of brush 16, causes reciprocation of the brush.

Between rod 116 and the pivot of bell crank 117 a link 118 is connected, the opposite end of the link being attached to one arm of a bell crank 119, the other arm of which causes reciprocation of leveler 71 because of its connection with connecting rod 75 attached thereto.

It will thus be seen that in the construction of the hood, which diverts dust from the dumped starch and candies back into the hopper, as well as in the well closed construction of the entire machine, we have overcome the objection raised to machines of this type heretofore as to the amount of dust issuing therefrom during their operation.

Furthermore, the refilling of the starch trays is accomplished more thoroughly and the amount of starch carried in the machine at any one time is very materially reduced.

The saving of candy tailings is an additional feature of advantage in our improved machine and results not only in this but in a more thorough cleaning of the starch than has been possible heretofore.

Heretofore, starch bucks have been so constructed that much of the operating mechanism has been located upon the outside and directly exposed to the workmen who frequently were injured thereby; starch bucks were also so constructed that the vibration was so great as to very materially shorten the life of the machine. The construction and arrangement of our machine is such that practically all of the operating mechanism is housed within the machine without any dangerous parts exposed to the workmen, and the construction and arrangement of the operating mechanism also is such as to overcome the objectionable vibrations heretofore encountered. Thus our machine is rendered substantially fool proof, also a great saving of power has been effected by our construction and arrangement of the operating parts.

Having thus described our invention what we claim is:

1. In a starch-buck, a candy cleaning section comprising a candy and starch separating sieve, a combined starch and tailing separating sieve mounted below and spaced apart from said candy and starch separating sieve, means for discharging the candy onto the candy cleaning screen, means for discharging the tailings upon the tailings cleaning screen, a starch conveyor located beneath the candy cleaning screen and the tailings cleaning screen, means to operate said sieves and screens, and a brush adapted to engage the candy and to reciprocate transversely across said candy cleaning screen.

2. In a starch-buck, a candy and starch separating sieve, a starch and tailings separating sieve spaced apart and mounted below said candy and starch separating sieve, a candy cleaning screen adapted to receive candy from said candy and starch separating sieve, a brush adapted to engage the candy upon the candy cleaning screen and to reciprocate transversely of said screen and a hopper adapted to receive tailings from said tailings and starch separating sieve.

3. In a starch-buck, a candy and starch separating sieve, a sectional starch and tailings separating sieve spaced apart and mounted below said candy and starch separating sieve, the sections of said latter sieve being arranged in different planes, a candy cleaning screen adapted to receive the candy from said candy and starch separating sieve, means to clean the candy and to discharge it, a tailings conveying screen and means for discharging said tailings.

4. In a starch-buck, a candy and starch separating sieve, a starch and tailings separating sieve spaced apart and mounted below said candy and starch separating sieve, a candy cleaning screen adapted to receive the candy from said candy and starch separating sieve, means for cleaning said candy as it passes over said candy cleaning screen, means for discharging said candy, and a tailings conveying screen adapted to separately discharge said tailings.

5. In a starch-buck, a candy and tailings separating means comprising a series of sieves arranged in different planes, a hopper and hood therefor having a rear wall slanting upwardly and backwardly and then curved forwardly and downwardly to retain the starch within the hopper.

6. In a starch-buck, a candy and tailings cleaning element comprising a candy receiving sieve, a tailings receiving sieve located beneath the candy receiving sieve and spaced therefrom, a frame in which said sieves are mounted, a roller supporting said frame at one end, a rocker arm connected to said frame at the other end, a brush, a pivotally mounted trough shaped screen and a rod connecting said screen to said rocker arm whereby it is reciprocated longitudinally, and means for simultaneously moving said brush transversely of the screen.

7. In a starch-buck, a candy tailings cleaning element comprising a candy receiving sieve, a tailings receiving sieve located beneath the candy receiving sieve and spaced therefrom, a frame in which said sieves are mounted, a roller supporting said frame at one end, a rocker arm connected to said frame at the other end, a brush, a pivotally mounted trough shaped screen, means for connecting said screen to said rocker arm whereby it is reciprocated longitudinally, and means for simultaneously moving said brush transversely of the screen.

GEORGE H. NUSS.
CHARLES F. HECKEL.